UNITED STATES PATENT OFFICE.

ALBERT BERTSCHMANN, OF BASEL, SWITZERLAND, ASSIGNOR TO THE FIRM OF SOCIETY OF CHEMICAL INDUSTRY IN BASLE, OF BASEL, SWITZERLAND.

YELLOW SULFIN DYE OF THE QUINOPHTHALONE SERIES AND PROCESS OF MAKING SAME.

No. 852,158.      Specification of Letters Patent.      Patented April 30, 1907.

Application filed February 20, 1907. Serial No. 358,375.

*To all whom it may concern:*

Be it known that I, ALBERT BERTSCHMANN, a citizen of the Swiss Republic, and a resident of Basel, Switzerland, have invented new and useful Yellow Sulfin Dyestuffs of the Quinophthalone Series and a Process for their Manufacture, of which the following is a full, clear, and exact specification.

According to this invention, by introducing even a single sulfhydrate group into quinophthalone derivatives, the latter acquire the character of sulfin dyestuffs which dye cotton without a mordant yellow to orange-yellow tints and may be fixed in the form of their disulfids to produce very fast dyeings.

The sulfhydrate group may be introduced according to the usual methods, either by direct displacement of the amido-group, or through the sulfinic acid derivative or sulfochlorid by reduction.

The simplest procedure for manufacturing the new thioquinophthalone derivatives consists in introducing the thio-group into the phthalic acid residue and condensing the thiophthalic acid with the quinaldins, in the presence or absence of condensing agents and diluents.

Example: A salt of beta-sulfophthalic acid is treated with phosphoric chlorid, whereby, after decomposing the product of the reaction by means of ice-water, the sulfochlorid of phthalic acid is obtained. By reducing the latter, for instance with zinc dust, beta-thiophthalic acid is produced as a yellow crystalline mass. This compound dissolves in ether, benzene, acetone and alcohol, as well as in hot water. It forms with alkalies and alkaline earths yellow, very easily soluble salts. The lead salt is obtained as an amorphous yellow precipitate by mixing a solution of thiophthalic acid with a solution of lead acetate. The melting point of this thiophthalic acid is not well marked, being between 160° and 170° C., the acid losing water at this temperature with formation of anhydrid.

For the manufacture of the dyestuff 20 parts by weight of the thiophthalic acid and 20 parts of beta-naphtho-quinaldin are heated together at 150° C. in an enameled vessel having a stirrer and heated by means of an oil bath; considerable foaming of the mass occurs. The temperature is raised within 4 hours to 200° C. and is maintained at this point for some hours until the condensation is complete.

The cooled, hard, solidified mass is finely powdered and may be applied directly; or the dyestuff may be purified, for instance by dissolution of the mass in dilute warm ammonium sulfid solution, filtration of the solution from some residual insoluble particles and precipitation of the dyestuff from the filtrate by addition of hydrochloric acid.

By filtering and washing the precipitate the dyestuff is obtained as a paste suitable for printing. When pressed, dried and ground, the precipitate becomes an orange-yellow powder. The dyestuff dissolves in alkali sulfids or in alkalies in presence of reducing agents with formation of orange-yellow alkali salts. In hydrosulfite preparations it dissolves to a citron-yellow solution. From the solutions acids precipitate the dyestuff as a yellow dyestuff acid; by adding oxidants the dyestuff is separated in the form of disulfid.

On cotton without a mordant the dyestuff dyes, in an alkali sulfid bath, the tint of the alkali salts of the dyestuff, namely orange-yellow, which by exposure to air or treatment with oxidants, for instance by passage through a solution of potassium chromate, becomes a very pure yellow of excellent fastness to washing and to light.

The dyestuff may be used in cotton printing and in dyeing and printing wool and silk according to the methods usual for vat dyestuffs.

In analogous manner, yellow thiophthaloquinone dyestuffs are obtained if ordinary quinaldin or its substitution products are used instead of the naphthoquinaldin of the foregoing example, and if dithiophthalic acid be substituted for the thiophthalic.

What I claim is:

1. The described process for the manufacture of yellow sulfin dyestuffs of the quinophthalone series by condensing thiophthalic acids with quinaldins.

2. As new products, the described yellow sulfin dyestuffs of the quinophthalone series constituting in dry state yellow powders soluble in alkali sulfids or in alkalies in presence of reducing agents with formation of orange yellow alkali salts, soluble in hydrosulfite preparations with yellow coloration and dyeing unmordanted cotton in alkali sulfid baths orange yellow tints becoming by oxidation on the fiber more pure yellow and fast to washing and to light.

In witness whereof I have hereunto signed my name this 1st day of February 1907, in the presence of two subscribing witnesses.

ALBERT BERTSCHMANN.

Witnesses:
GEO. GIFFORD,
AMAND BRAEM.